Dec. 18, 1956  H. BUERGER  2,774,480
BEVERAGE AND SNACK DISPENSER FOR AUTOMOBILES
Filed Oct. 21, 1953.  2 Sheets-Sheet 1
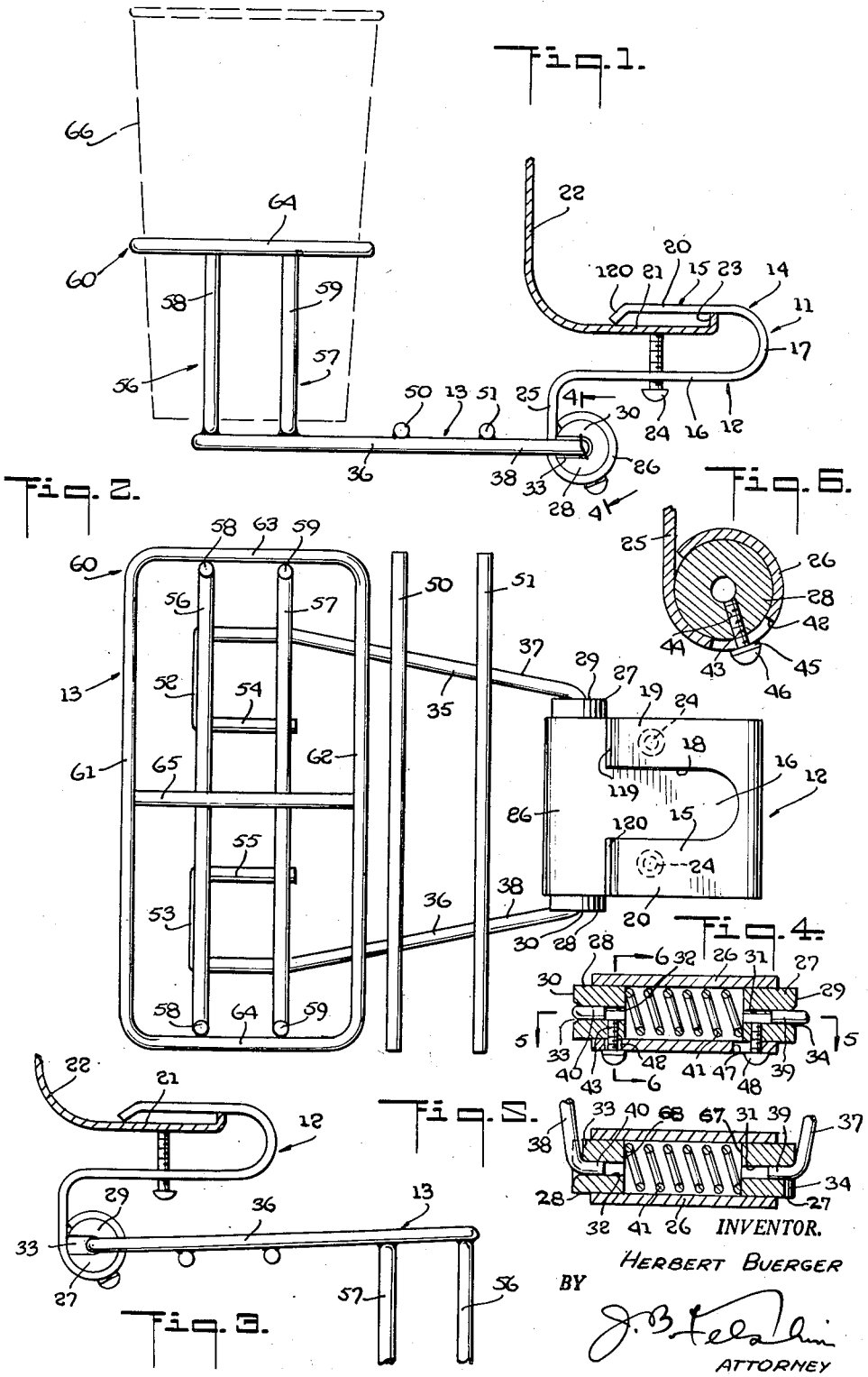
INVENTOR.
HERBERT BUERGER
BY
ATTORNEY

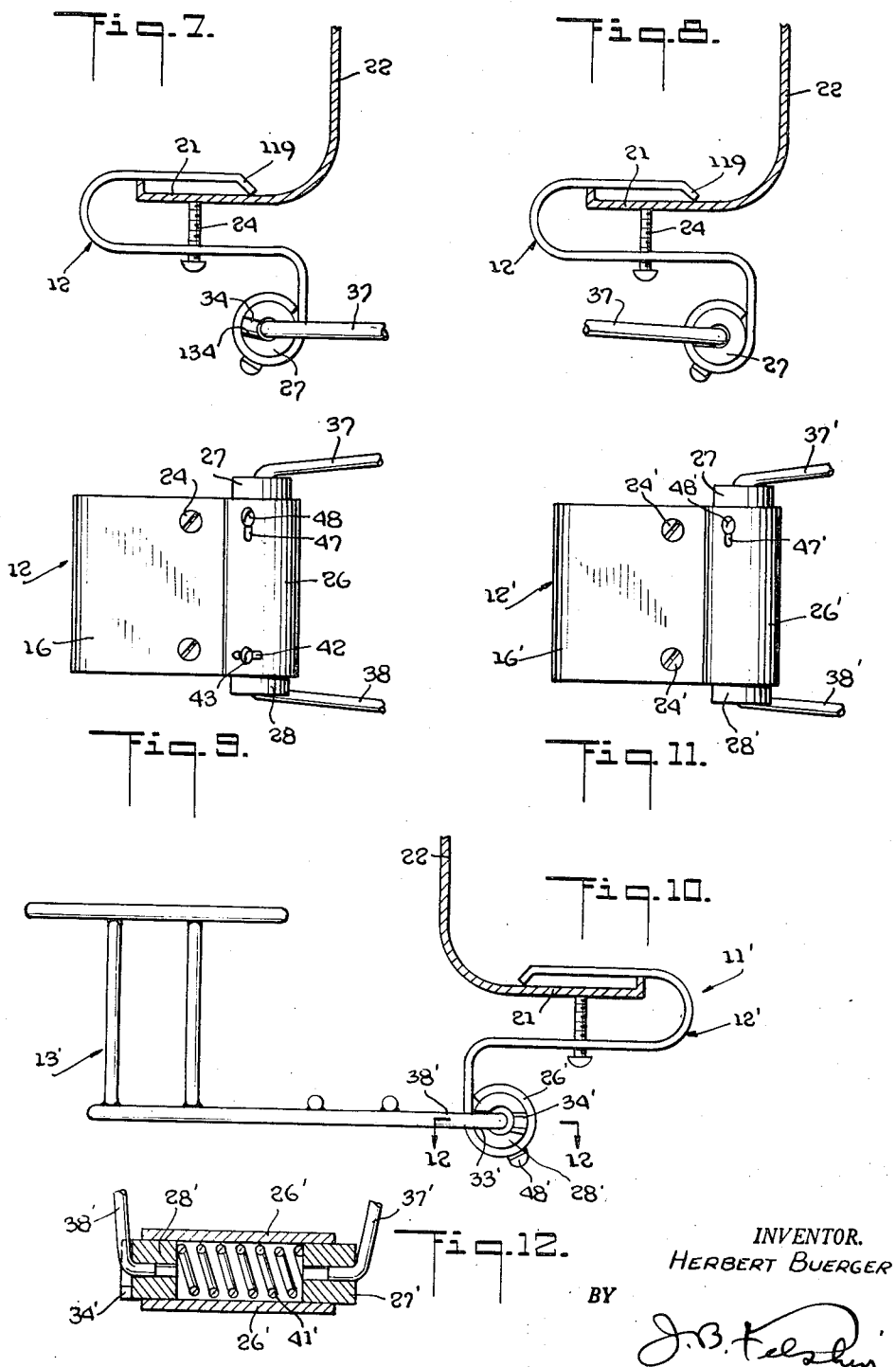

United States Patent Office 2,774,480
Patented Dec. 18, 1956

2,774,480
BEVERAGE AND SNACK DISPENSER FOR AUTOMOBILES
Herbert Buerger, Walton, N. Y.
Application October 21, 1953, Serial No. 388,318
12 Claims. (Cl. 211—86)

This invention relates to a serving tray device of the type adapted to be mounted on an automobile instrument panel for holding sandwiches, beverage glasses, and other articles.

A primary object of the present invention is to provide a tray device of the character described, comprising a bracket attachable to the instrument panel, a serving tray, means rotatably mounting one end of the tray to the bracket for rotation of the tray about a horizontal axis whereby the tray may assume a horizontal rearwardly extending operative position, or be rotated downwardly and forwardly to a stored inoperative position, and a novel locking means on said bracket for selectively engaging or disengaging said one end of the tray and for maintaining the latter in its operative position.

A further object is to provide a tray device of the character described, having spring means urging said one end of the tray toward engaging relationship with said locking means and being yieldable to permit said tray end to be moved out of engagement therewith.

Another object is to provide a tray device as characterized above wherein said locking means comprises a recess or groove adapted to receive a portion of the tray, said tray end being laterally slidable with respect to the bracket to engage said tray portion into or out of engagement with said groove, said spring means urging the tray laterally toward an engaging position.

Still another object is to provide the bracket with a hollow cylindrical portion having two cylindrical members mounted in the opposite ends thereof, one of said members being fixedly secured and the other member being laterally slidable within the cylindrical portion, said spring means urging said other member laterally outwardly away from said fixed member, each of said members having a cylindrical opening coaxial with the cylindrical portion and extending laterally inwardly from the outer end face of the member, said fixed member outer end face having said locking groove formed therein and extending radially outwardly from the cylindrical opening, the tray having a pair of spaced wire arms having inwardly bent ends rotatably mounted within said cylindrical openings respectively, one of said arms adapted to engage within said groove to maintain the tray in a horizontal operative position.

A further object is to provide a second groove on either of said members and extending at an angle with respect to the first groove so as to engage one of said tray arms to maintain the tray in a stored inoperative position.

Still another object is to provide means for adjusting the angle of said fixed member and hence also the angle of said first groove whereby the tray may assume a horizontal position when in locking engagement with the first groove irrespective of angular deviations of the position of the bracket when attached to different instrument panels.

A further object is to provide the bracket with a simple, economical, and novel construction adapted to be formed of a single integral strip of sheet metal, the tray also being economical to manufacture, and being formed by a plurality of wire or rod members secured to the wire arms.

Other objects and advantages of the invention are inherent in the structure disclosed and claimed or will be apparent to those skilled in the art from the detailed description in connection with the accompanying drawings wherein:

Fig. 1 is a side elevational view of a preferred embodiment of the serving tray device shown mounted on an automobile instrument panel, in section, with the tray in operative position;

Fig. 2 is a top plan view of the tray device of Fig. 1;

Fig. 3 is a partial view similar to Fig. 1 but showing the tray in its stored inoperative position under the instrument panel;

Fig. 4 is a sectional view on the line 4—4 of Fig. 1;

Fig. 5 is a sectional view on the line 5—5 of Fig. 4;

Fig. 6 is a sectional view on the line 6—6 of Fig. 4;

Fig. 7 is a side elevational view similar to Fig. 1 but showing the opposite side of the device with the tray in operative position;

Fig. 8 is a view similar to Fig. 7 but showing the tray in its stored inoperative position;

Fig. 9 is a bottom plan view with the tray broken away;

Fig. 10 is a side elevational view of a modified form of the invention;

Fig. 11 is a bottom plan view of the modification of Fig. 10; and

Fig. 12 is a sectional view on the line 12—12 of Fig. 10.

Referring now to the drawing in more detail, the reference numeral 11 indicates generally a preferred form of the serving tray device of the present invention and comprising a bracket 12 and a tray 13. Bracket 12 is formed of a single integral strip of sheet metal including a U-shaped portion 14 having upper and lower sections 15, 16 joined by a rounded section 17. Upper section 15 is bifurcated by a large slot 18 to increase the resiliency of U-shaped portion 14 and the forward ends of the bifurcations 19, 20 thus provided are bent downwardly at 119, 120, to engage the flange 21 of the automobile instrument panel 22. The inner edge of panel flange 21 is provided with an upwardly projecting section 23 engaging forward portions of bifurcations 19, 20 of bracket 12. The lower section 16 of bracket 12 has two threaded holes therethrough receiving a pair of screws 24 engaging the lower surface of panel flange 21. It will thus be seen that bracket 12 may be securely mounted on instrument panel 22.

The rear end of lower bracket section 16 is integral with a vertical portion 25, the lower end of which is bent around to form a hollow cylindrical portion 26 having a horizontally-extending axis.

A pair of cylindrical members 27, 28 are mounted within the opposite open ends of cylindrical portion 26 and project laterally outwardly therefrom. The outer end faces 29, 30 of members 27, 28 are preferably flat and extend in planes perpendicular to the axis of cylindrical portion 26. Members 27, 28 are each provided with a cylindrical opening 31, 32 respectively extending inwardly from outer end faces 29, 30 and approximately coaxial with cylindrical portion 26. The outer end face 30 of member 28 is further provided with a recess or groove 33 extending rearwardly and radially outwardly from opening 32 to the peripheral edge of face 30 and end face 29 of the other member 27 is similarly provided with a groove 34. It will be noted that groove 34 extends in a direction opposite to groove 33 at an angle of approximately 180° with respect thereto.

The serving tray 13 comprises a pair of spaced forwardly-converging wire or rod elements 35, 36, the forward ends of which project forwardly to serve as mounting arms 37, 38 and are bent laterally inwardly at 39, 40 to project into cylindrical openings 31, 32 of members 27, 28. Lateral bent portions 39, 40 are rotatably mounted within openings 31, 32 and thus serve to mount tray 13 to bracket 12 for rotation of tray 13 about a horizontal axis to either the rearwardly-extending horizontal operative position shown in Figs. 1 and 7, or to the forwardly-extending stored inoperative position underneath instrument panel 22, as shown in Figs. 3 and 8.

A compression coil spring 41 is enclosed within cylindrical portion 26 and abuts against the opposite inner end faces 67, 68 of cylindrical members 27, 28. Since member 28 is fixedly secured within cylindrical portion 26 and member 27 is slidably reciprocal therein, as will be explained below, compression coil spring 41 normally urges member 27 laterally outwardly to its outermost position thereby causing tray arms 37, 38 to engage the outer end faces 29, 30 of members 27, 28. When tray 13 is moved to the operative position shown in Fig. 1, arm 30 will enter and engage groove 33 and will be retained therein due to the tendency of spring 41 to urge tray 13 toward the right as viewed in Figs. 4 and 5. The tray 13 is thus maintained locked in the operative position.

When it is desired to move tray 13 toward the inoperative stored position of Fig. 3, tray 13 is first grasped and moved laterally against the action of spring 41 to cause member 27 to slide inwardly toward member 28 and to cause tray arm 38 to move laterally outwardly out of locking engagement with groove 33. Tray 13 is now free to rotate downwardly and forwardly to the inoperative position at which point the opposite tray arm 37 will enter and engage within the groove 34 formed in cylindrical member 27 to retain tray 13 in the inoperative position.

As best shown in Fig. 7, the lower edge 134 of groove 34 is beveled or rounded whereby arm 37 may be easily disengaged from groove 34 by merely exerting a sufficient torque on tray 13 to rotate it upwardly and rearwardly. This beveled or rounded edge 134 is feasible since there is no load on tray 13 when in the stored position, groove 34 merely providing enough resistance to support the weight of tray 13.

As stated above, member 28 is fixedly secured within cylindrical portion 26. It is preferable to provide that member 28 be angularly adjustable in the following manner. At the bottom of cylindrical portion 26 and adjacent the end thereof containing member 28, there is provided an arcuate slot 42. A screw 43 extends through slot 42 and is threadedly engaged within a suitable threaded opening 44 formed in member 28. A washer 45 is mounted between the head 46 of screw 43 and the outer surface of cylindrical portion 26. It will thus be seen that when screw 43 is loosened, member 28 may be rotated so as to adjust groove 33 to any desired angle, after which screw 43 is tightened to press washer 45 into frictional engagement with cylindrical portion 26 thereby fixedly securing member 28 in its adjusted position. The device 11 may therefore be mounted on various types of instrument panels having different angles of panel flange 21 and member 28 may be adjusted to provide that tray 13 extend horizontally when in the locked operative position.

In order to limit member 27 to reciprocal non-rotatable sliding movement, the bottom of cylindrical portion 26 is provided with a slot 47 extending longitudinally thereof and receiving a screw 48 engaged within a threaded opening formed in member 27. It will be seen that screw 48 abuts against the outer end of slot 47 to limit the laterally outward movement of member 27.

Tray 13 comprises a pair of parallel transverse horizontal rods 50, 51 welded to rod elements 35, 36 and adapted to support sandwiches or other articles placed thereon. The rear ends of rod elements 35, 36 are bent laterally inwardly at 52, 53 and then forwardly at 54, 55 and have welded thereto a pair of U-shaped rods 56, 57 having vertical legs 58, 59, respectively. The upper ends of the latter are welded to a rectangular-shaped frame 60 having parallel transversely-extending portions 61, 62 integral with end portions 63, 64. A brace element 65 is welded at its opposite ends to portions 61, 62 and serves to divide tray 13 into two compartments each adapted to receive a bereverage glass indicated at 66 by the dashed lines in Fig. 1.

Referring now to Figs. 10 to 12 wherein is illustrated a modified form of the invention, indicated generally by the reference numeral 11'. The tray 11' is similar in most respects to the preferred embodiment 11 described above, and the corresponding elements of the second modification 11' are shown as having the same reference numerals with the addition of a prime mark and hence need not be further described.

Member 27' of device 11' is not provided with a groove as in device 11. Instead, a groove 34' is formed in member 28 in alignment with groove 33' but extending radially outwardly from cylindrical opening 32' in a direction opposite to that of groove 33'. Furthermore, member 28' is permanently fixed to cylindrical portion 26' as by welding and hence is not adjustable.

It will thus be obvious that arm 38' of tray 13' may engage either groove 33' to maintain tray 13' in the rearward operative position or groove 34' to maintain tray 13' in the forward inoperative position underneath instrument panel 22'.

It is to be understood that the specific embodiments shown in the drawing and described above, are merely illustrative of two of the many forms which the invention may take without departing from the scope thereof delineated in the appended claims.

Having thus described my invention what I claim as new and desire to secure by Letters Patent of the United States is:

1. A serving tray device adapted to be mounted on an automobile instrument panel and comprising a bracket, means for attaching the bracket to an instrument panel, a serving tray, said bracket having a hollow cylindrical portion having a horizontally extending axis, a pair of members mounted within opposite ends of said cylindrical portion and projecting outwardly therefrom, means fixedly securing one of said members to said cylindrical portion against movement, means for mounting said other member for limited non-rotating sliding movement inwardly of said cylindrical portion toward said one member, a coil compression spring within said cylindrical portion and between said pair of members urging said other member outwardly in a direction away from said one member, said tray having a pair of extending arms, means pivotally connecting the ends of said tray arms with said pair of members respectively for rotation about the horizontal axis of said cylindrical portion, and means on said one member for releasably engaging the respective adjacent tray arm to maintain the tray against rotation in an outwardly extending operative horizontal position.

2. A device as recited in claim 1 wherein said last-recited means comprises a groove formed in said one member, said arm being disengageably engageable within said groove.

3. A device as recited in claim 2, wherein said groove is formed in the outer end of said one member, said spring means urging said other member and said tray in an endwise direction to resiliently maintain said respective adjacent tray arm in engagement with said groove.

4. A device as recited in claim 3 wherein said one member is rotatably mounted within said cylindrical portion for rotation about the axis thereof, and means for fixedly securing said one member in a selected one of several positions to adjust the angle of said groove and hence the angle of said tray when in the operative position in engagement with the groove.

5. A device as recited in claim 4 wherein said pivotally connecting means comprises a cylindrical opening formed in each of said members and extending inwardly approximately coaxial with said cylindrical portion from the outer end face of the member, said groove being formed in the outer end face of said one member and communicating with said opening and extending radially outwardly therefrom to the outer periphery of said member end face, said respective adjacent tray arm comprising a first cylindrical portion rotatably mounted within said opening of said one member and a second portion engageable with said one member outer end face and adapted to engage within said groove.

6. A device as recited in claim 5 wherein said other member is provided with a groove on its outer end face and communicating with the opening therein and extending radially outwardly from said opening to the outer periphery of said other member, the other tray arm having a first cylindrical portion rotatably mounted within said opening of said other member and a second portion engageable with said other member outer end face and adapted to engage within said last-recited groove to maintain the tray in an inoperative stored position.

7. A serving tray device adapted to be mounted on an automobile instrument panel and comprising a bracket having an arm portion adapted to be secured to an instrument panel and a hollow horizontally-extending cylindrical portion integral with said arm portion, a pair of cylindrical members within opposite ends of said hollow cylindrical portion, means fixedly securing one of said members against both sliding and rotating movement with respect to the cylindrical portion, a coil compression spring within said cylindrical portion and between said pair of members, urging the other member laterally outwardly, means limiting the outward movement of said other member, each of said members having an outer end face lying in a plane perpendicular to the axis of said cylindrical portion and a cylindrical opening extending inwardly from said outer end face and approximately coaxial with said cylindrical portion, the outer end face of said one member having formed therein a groove extending horizontally forwardly and radially outwardly from said opening and a serving tray having a pair of spaced wire arms extending rearwardly therefrom, the rear ends of said arms being bent laterally inwardly and rotatably mounted within said cylindrical openings, said arms engaging said outer end faces of said members and said groove adapted to receive the respective adjacent one of said arms when the latter are in a horizontal position so as to thereby retain said tray in a rearwardly extending horizontal operative position.

8. A device as recited in claim 7 wherein the other of said members is provided with a groove on its outer end face, said last-recited groove extending radially outwardly from the opening in said other member and in a direction angularly disposed with respect to said first-recited groove so as to engage the other of said arms to retain the tray in a stored inoperative position.

9. A serving tray device adapted to be mounted on an automobile instrument panel and comprising a bracket having an arm portion adapted to be secured to an instrument panel and a hollow horizontally-extending cylindrical portion integral with said arm portion, a pair of cylindrical members within opposite ends of said hollow cylindrical portion, means fixedly securing one of said members against both sliding and rotating movement with respect to the cylindrical portion, spring means within said cylindrical portion and urging the other member laterally outwardly, means limiting the outward movement of said other member, each of said members having an outer end face lying in a plane perpendicular to the axis of said cylindrical portion and a cylindrical opening extending inwardly from said outer end face and approximately coaxial with said cylindrical portion, the outer end face of said one member having formed therein a groove extending horizontally forwardly and radially outwardly from said opening, the outer end face of said one member having formed therein a groove extending radially outwardly from said opening, and a serving tray having a pair of spaced wire arms extending therefrom, the ends of said arms being bent laterally inwardly and rotatably mounted within said cylindrical openings, said arms engaging said outer end faces of said members and said groove adapted to receive the respective adjacent one of said arms so as to thereby retain said tray in a rearwardly extending horizontal operative position.

10. A device as recited in claim 9 wherein said means securing one of said members comprises an arcuate slot formed in said cylindrical portion and extending circumferentially partially therearound about the axis thereof, said one member having a threaded hole formed therein and extending radially inward from the outer cylindrical surface thereof, and a screw engaged within said hole and extending radially outwardly through said arcuate slot and having a head engaging the outer surface of the cylindrical portion to adjustably secure said one member in any selected one of several angular positions so as to adjust the angle of said groove and hence the angle of said tray when in the operative position.

11. A device as recited in claim 10 wherein the other of said members is slidably but non-rotatably movable with respect to the cylindrical portion and is provided with a groove on its outer end face, said last-recited groove extending radially outwardly from the opening in said other member and in a direction angularly disposed with respect to said first-recited groove so as to engage the other of said arms to retain the tray in a stored inoperative position at a different angle than said horizontal operative position, said last-recited groove having a sloping side wall to permit the arm engaged therein to slide out of said groove upon the application of pressure on said tray so as to permit the tray to be moved toward the operative position.

12. A serving tray device adapted to be mounted on an automobile instrument panel and comprising a bracket, means for attaching the bracket to an instrument panel, a serving tray, means rotatably mounting one end of the tray to the bracket for rotation of the tray about a horizontal axis whereby the tray may assume a horizontal rearwardly extending operative position or be rotated downwardly and forwardly to a stored inoperative position, locking means on said bracket for selectively engaging or disengaging said one end of the tray and for maintaining the latter in its operative position when engaged therewith, and spring means urging said tray end toward engaging relationship with said locking means and being yieldable to permit said tray end to be moved out of engagement therewith, said serving tray comprising a first group of wire elements extending horizontally and lying approximately in a common plane, a second group of wire elements secured to said first group of elements and extending upwardly therefrom, and a third group of wire elements extending horizontally and lying approximately in another common plane spaced above said first common plane, said first group of wire elements forming a horizontal bottom to support the lower surfaces of beverage containers, said third group of wire elements forming therebetween a plurality of compartments each adapted to receive a beverage container and to engage the side walls of the latter to prevent it from accidentally falling from said bottom formed by the first group of wire elements.

References Cited in the file of this patent

UNITED STATES PATENTS

| | | |
|---|---|---|
| 1,186,607 | Powell | June 13, 1916 |
| 1,707,628 | Donosa | Apr. 2, 1929 |
| 2,454,889 | Shelton et al. | Nov. 30, 1948 |
| 2,475,202 | Sammons | July 5, 1949 |
| 2,486,279 | Hathaway | Oct. 25, 1949 |
| 2,546,459 | Lee | Mar. 27, 1951 |
| 2,574,250 | Dalton | Nov. 6, 1951 |
| 2,578,153 | Schmitz | Dec. 11, 1951 |

FOREIGN PATENTS

| | | |
|---|---|---|
| 707,752 | France | Apr. 20, 1931 |